United States Patent
Nakahira

(10) Patent No.: US 7,589,778 B2
(45) Date of Patent: Sep. 15, 2009

(54) DIGITAL CAMERA

(75) Inventor: Toshiaki Nakahira, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 785 days.

(21) Appl. No.: 10/697,285

(22) Filed: Oct. 31, 2003

(65) Prior Publication Data

US 2004/0141082 A1    Jul. 22, 2004

(30) Foreign Application Priority Data

Nov. 1, 2002    (JP) .............................. 2002-320010

(51) Int. Cl.
*H04N 5/222* (2006.01)
*H04N 5/262* (2006.01)
(52) U.S. Cl. ............................ 348/333.01; 348/333.12; 348/240.99; 348/240.2
(58) Field of Classification Search ............ 348/333.01, 348/333.03, 333.11, 333.12, 345, 240.2, 348/240.99, 312, 372, 296
See application file for complete search history.

(56) References Cited

U.S. PATENT DOCUMENTS

| | | | | |
|---|---|---|---|---|
| 6,130,420 A * | 10/2000 | Tanaka et al. | ............ | 250/208.1 |
| 6,646,680 B1 * | 11/2003 | Mead et al. | .............. | 348/230.1 |
| 6,700,607 B1 * | 3/2004 | Misawa | .................... | 348/230.1 |
| 6,700,610 B1 * | 3/2004 | Kijima et al. | ............... | 348/296 |
| 6,853,401 B2 * | 2/2005 | Fujii et al. | ............... | 348/223.1 |
| 6,870,566 B1 * | 3/2005 | Koide et al. | ................. | 348/296 |
| 7,388,607 B2 * | 6/2008 | Nakahira | ................ | 348/240.2 |
| 2001/0012072 A1 * | 8/2001 | Ueno | .................... | 348/333.02 |
| 2003/0030737 A1 * | 2/2003 | Yanai | ......................... | 348/296 |

FOREIGN PATENT DOCUMENTS

| | | |
|---|---|---|
| JP | 11-196301 | 7/1999 |
| JP | 11-298791 | 10/1999 |
| JP | 2001-197348 | 7/2001 |
| JP | 2001-211351 | 8/2001 |
| JP | 2002-118247 | 4/2002 |
| JP | 2002-314866 | 10/2002 |

* cited by examiner

*Primary Examiner*—David L Ometz
*Assistant Examiner*—Richard M Bemben
(74) *Attorney, Agent, or Firm*—Oblon, Spivak, McClelland, Maier & Neustadt, P.C.

(57) ABSTRACT

A digital camera includes an imaging device driven by at least two kinds of drive modes, an image display device having a number of pixels less than a number of pixels of the imaging device, and an enlarging display setting device that enlarges a part of an area of a whole image obtained by the imaging device at a desired enlargement ratio and to display an enlarged image on the image display device. One of the at least two kinds of drive modes for driving the imaging device is selected such that a resolution of the part of the area of the whole image to be enlarged is greater than a resolution of the image display device.

30 Claims, 7 Drawing Sheets

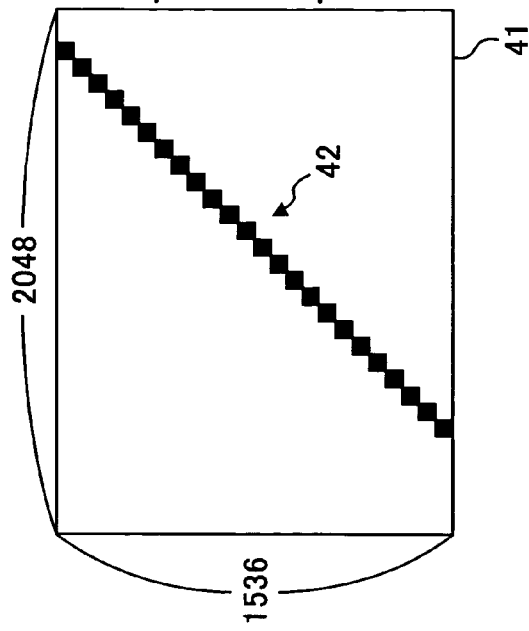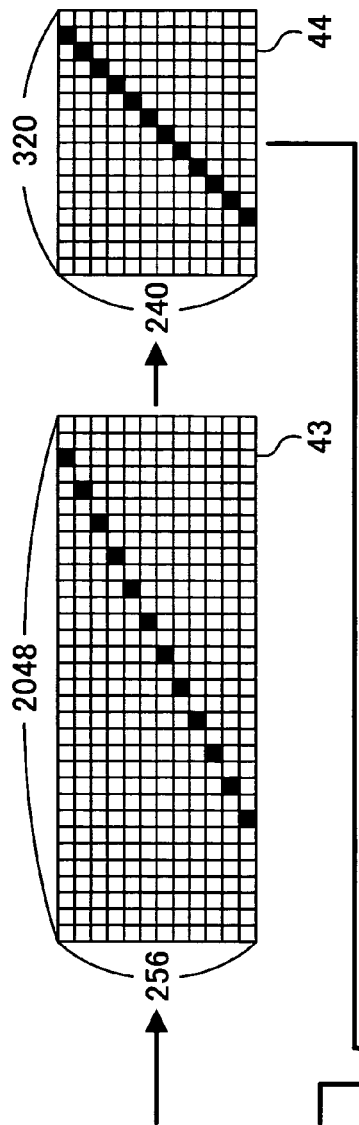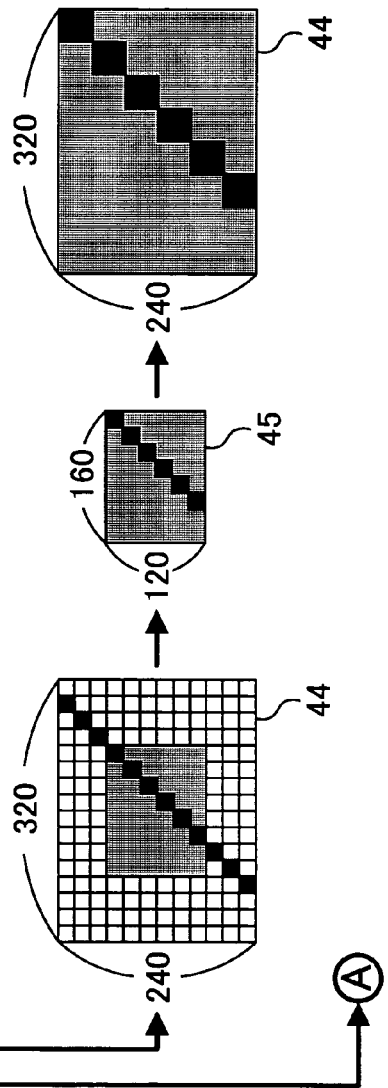

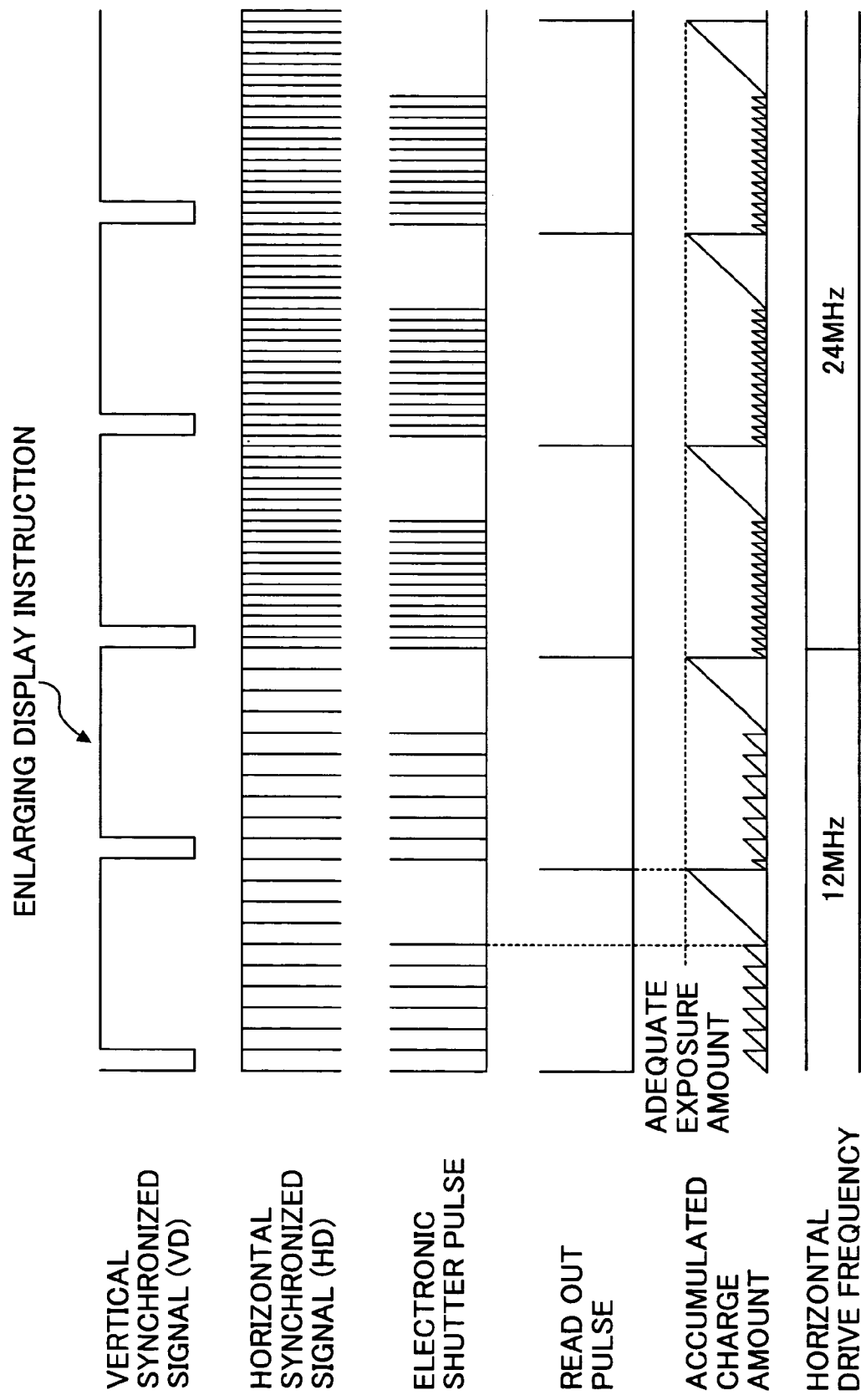

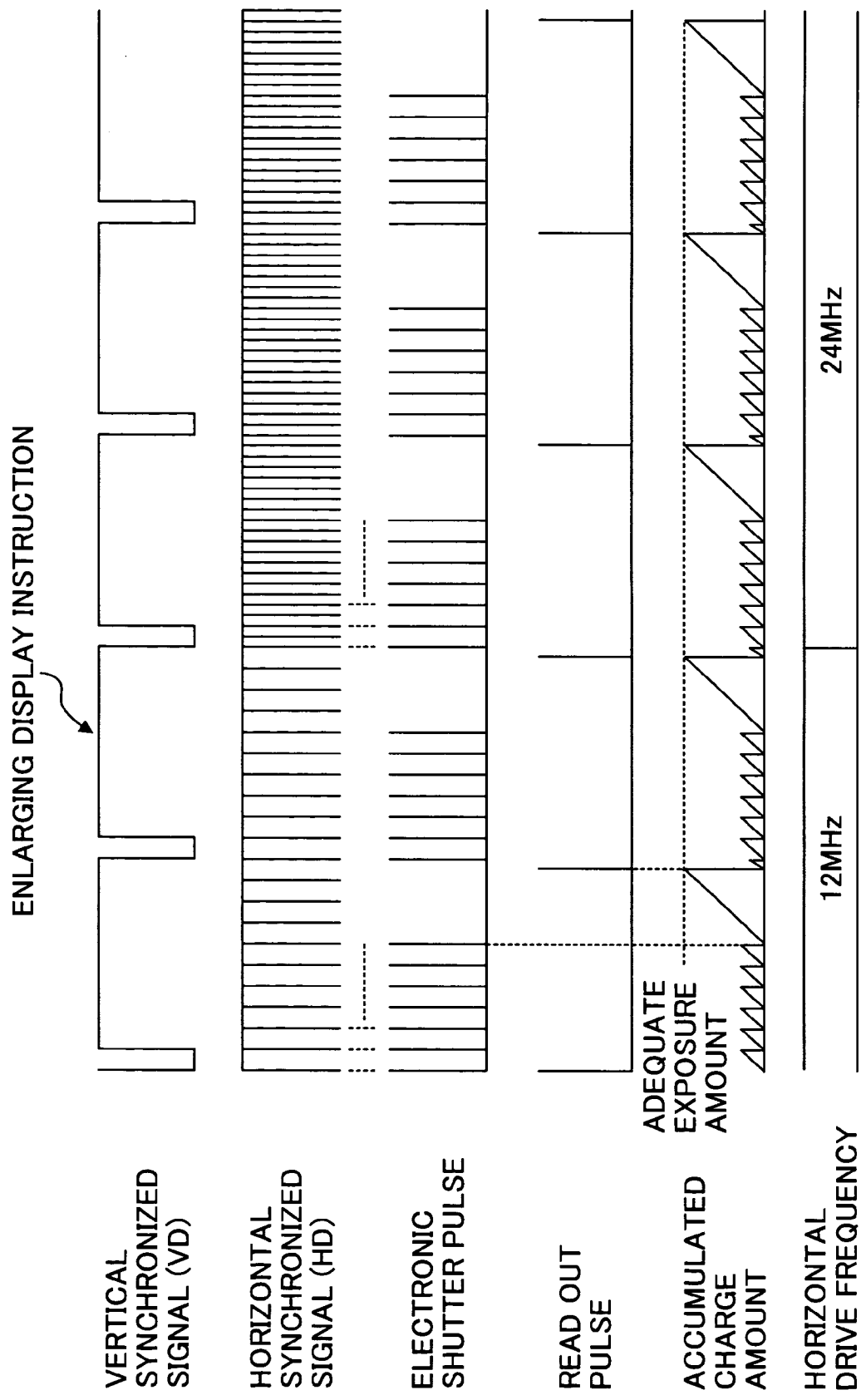

DIGITAL CAMERA

CROSS-REFERENCE TO RELATED APPLICATIONS

The present application claims priority to Japanese Patent Application No. 2002-320010 filed in the Japanese Patent Office on Nov. 1, 2002, the disclosure of which is incorporated herein by reference.

BACKGROUND OF THE INVENTION

1. Field of the Invention

The present invention relates to a digital camera, more particularly to an image display device in the digital camera.

2. Background of the Art

A ⅓ through ½ type charge-coupled device (CCD) has been widely used in a digital camera. With a decrease of a pixel size, such a ⅓ through ½ type CCD tends to have a large number of pixels, such as, 3 through 5 million pixels. On the other hand, a digital camera includes a display device, such as, a liquid crystal display (LCD) having about 0.1 million pixels. The size of an LCD has been required to be reduced due to demands for the decrease of the size of a digital camera. For this reason, an LCD has a relatively small number of pixels compared to a CCD.

A CCD of interlace type has been mainly used due to the merit in reducing the size of a CCD. In the CCD of interlace type, due to the decrease of capacity of a potential well in a vertical transfer path, the CCD of interlace type tends to read out overall pixels by dividing a frame into three or four fields rather than by dividing a frame into two fields.

In a CCD of primary color filter type that reads out pixels in an odd number of fields such as three fields, three primary color (red, green, blue) pixels can be read out from one field. Therefore, necessary information for preparing a color image is obtained only from the one field. For example, when using a 5 million pixel CCD having an aspect ratio of 4 to 3, the number of horizontal lines used for recording is generally 1944. When reading out overall pixels by dividing a frame into three fields, the number of horizontal lines used for recording per one field is 648 (i.e., 1944×⅓).

Generally, a CCD is driven by at least two drive modes, that is, a draft mode and a frame mode. In the draft mode, lines for reading out pixels in the vertical direction are limited for framing at the time of monitoring. The number of such limited lines is about 250 that is close to the number of lines of single field for TV picture signals. A refresh speed of a frame (time for reading out pixels in one frame) is set to from about 1/60 to about 1/15 seconds for smooth framing. In the frame mode, overall pixels are read out. For example, when using the above-described 5 million pixel CCD, time for reading out pixels in one field is from about 1/20 to ⅕ seconds unless a horizontal drive frequency is changed. This is because the number of horizontal lines for reading out pixels per one field in the frame mode is 648 which is about three times of the number of lines for reading out pixels in the draft mode (i.e., about 250).

As described above, many CCDs have been used, which obtain images of different resolutions with different number of horizontal lines at a relatively high speed while changing drive modes for CCDs. In the case of an imaging device that can perform a random access, such as, a complementary metal oxide semiconductor (CMOS) sensor, such an imaging device can change the resolution of an image output from the imaging device by cutting any desired part of pixels out of overall pixels in an angle of view. However, a digital camera rarely uses a CMOS sensor as an imaging device due to a problem such as a fixed pattern noise.

In this specification, a term of "resolution" indicates the number of pixels in a vertical or horizontal direction. Especially, the number of pixels in a vertical direction may be referred to as the number of lines.

As described above, an imaging device can perform monitoring with different resolutions at a relatively high speed while changing drive modes, such as, a draft mode and a frame mode. In view of this situation, when an image is output to an LCD having about 200 horizontal lines, the image has no problem with its resolution even if pixels are read out by the draft mode. The monitoring by the frame mode is not usually considered because of high consumption of electric power.

However, when an operator of a digital camera confirms a focus condition of an image, the image is required to be monitored with high resolution. There is a background digital camera having a manual focus function in which an operator adjusts a focus position while monitoring an image output to an LCD. In such a digital camera, an image is enlarged and displayed on a part of a screen of an LCD for confirming a focus condition of the image. Such a digital camera is described, for example, in published Japanese patent application Nos 11-196301 and 11-298791. There is another background digital camera having an auto focus function in which a part of an image or a focus area is temporarily enlarged and displayed on a part or the whole of a screen of an LCD for confirming a focus condition when an auto focus operation is completed. Such a digital camera is described, for example, in published Japanese patent application No. 2001-211351.

In these background digital cameras, an image is enlarged and displayed by an image processing large-scale integration (LSI) while driving a CCD by a draft mode. In this condition, the resolution of picture signals obtained from an imaging device (CCD) is low with respect to that of a display device (LCD). Therefore, even though an image is enlarged, an operator cannot confirm a focus condition clearly.

There is a background technique in which overall pixels are always read out from an imaging device having pixels greater than those of a display device. Then, readout pixels are thinned out by an image processing LSI. For example, Japanese patent application No. 11-298791 describes this technique. When using a 1.5 million pixel CCD of progressive type, overall pixels can be read out in about 1/7.5 seconds. A recently-used 3 million pixel CCD does not have such a progress type yet. Assuming that a 3 million pixel CCD of progressive type exists, it takes double time to read out overall pixels than 1.5 million pixel CCD of progressive type even if the CCD is horizontally driven at a maximum frequency allowed by an imaging device. In addition, the consumption of electric power of periphery IC for driving the CCD at a high speed becomes constantly high. On the other hand, if a horizontal drive frequency is decreased, the consumption of electric power is decreased. However, a refresh rate of a display during monitoring decreases, thereby deteriorating operability of a digital camera.

SUMMARY OF THE INVENTION

According to an aspect of the present invention, a digital camera includes an imaging device driven by at least two kinds of drive modes, an image display device having a number of pixels less than a number of pixels of the imaging device, and an enlarging display setting device configured to enlarge a part of an area of a whole image obtained by the imaging device at a desired enlargement ratio and to display an enlarged image on the image display device. One of the at least two kinds of drive modes for driving the imaging device is selected such that a resolution of the part of the area of the whole image to be enlarged is greater than a resolution of the image display device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4A is a schematic view illustrating an image projected on the CCD;

FIG. 4B is a schematic view illustrating data output from the CCD, which is thinned out in the vertical direction in a draft mode;

FIG. 4C is a schematic view illustrating an image displayed on an LCD in the draft mode;

FIG. 4D is a schematic view illustrating the image displayed on the LCD of FIG. 4C, in which a partial area is hatched;

FIG. 4E is a schematic view of a hatched area of FIG. 4D;

FIG. 4F is a schematic view of an enlarged image displayed on the LCD;

FIG. 5 is a timing chart for explaining electronic shutter pulses according to the embodiment of the present invention; and FIG. 6 is a timing chart for explaining electronic shutter pulses according to an alternative embodiment of the present invention.

DETAILED DESCRIPTION OF THE PREFERRED EMBODIMENTS

Figure 1:
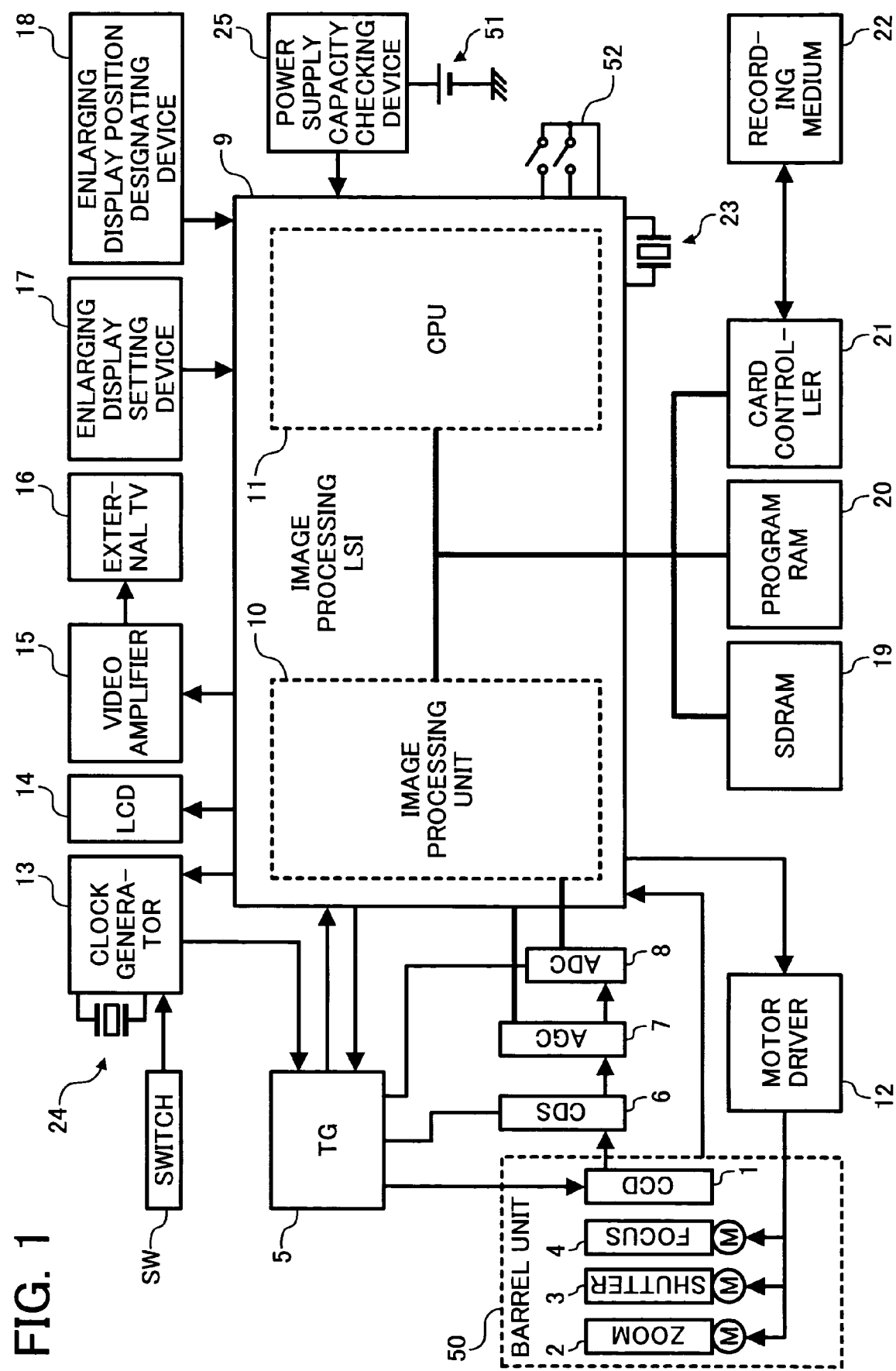
FIG. 1 is a block diagram of a digital camera according to an embodiment of the present invention.

Preferred embodiments of the present invention are described in detail referring to the drawings, wherein like reference numerals designate identical or corresponding parts throughout the several views.

FIG. 1 is a block diagram of a digital camera according to an embodiment of the present invention. A digital camera illustrated in FIG. 1 includes a barrel unit 50, a charge coupled device (CCD) 1 functioning as an imaging device, a zooming mechanism 2, a shutter mechanism 3, a focus mechanism 4, a timing generator (TG) 5, a correlate dual sampling (CDS) 6, an automatic gain controller (AGC) 7, an analog to digital converter (ADC) 8, an image processing large-scale integration (LSI) 9, an image processing unit 10, a central processing unit (CPU) 11, a motor driver 12, a clock generator 13, a liquid crystal display (LCD) device 14 functioning as an image display device, a video amplifier 15, an external television 16, an enlarging display setting device 17, an enlarging display position designating device 18, a synchronous dynamic random access memory (SDRAM) 19, a program random access memory (RAM) 20, a card controller 21, a recording medium 22, clock generating oscillators 23 and 24, a power supply capacity checking device 25, a power supply 51, and a release button 52 used for performing a shutter release operation for photographing.

An operation of the digital camera according to the embodiment of the present invention will be described. The digital camera uses the CCD 1 having 3 million pixels. The CCD 1 is a CCD of interlace type, and reads out overall pixels by dividing a frame into three fields. The CCD 1 includes primary color filters.

An operator operates the zooming mechanism 2 and the focus mechanism 4 in the barrel unit 50 via the motor driver 12. As a result, a desired object area is imaged on the CCD 1. The CCD 1 is driven by a clock signal generated from the TG 5. Obtained image data is doubly sampled by the CDS 6 while removing reset noise therefrom. The signal level of the image data is adjusted by the AGC 7. Subsequently, the ADC 8 converts analog image data to digital image data.

The digital image data is taken in the image processing unit 10 in the image processing LSI 9, and is subjected to various kinds of processing in accordance with instructions from the CPU 11 that reads processing steps from the program RAM 20. The various kinds of processing include an image display on the LCD 14. The CCD 1 is basically driven by a draft mode (described below) for displaying an image on the LCD 14. When an operator needs to confirm a focus condition of an image in more detail, the operator operates the enlarging display setting device 17, and thereby a part of an image is enlarged and displayed on the LCD 14. At this time, a drive mode for the CCD 1 can be switched to a frame mode (described below) from the draft mode. In addition, if necessary, a horizontal drive frequency can be increased. The horizontal drive frequency is changed by changing a clock frequency output from the clock generator 13 and supplying changed clock frequency to the TG 5 in accordance with an instruction from the image processing LSI 9. The CPU 11 controls the switch of a drive mode and the output of electronic shutter pulses for controlling an amount of exposure light, and thereby corresponding pulses are output from the TG 5.

Figure 2:
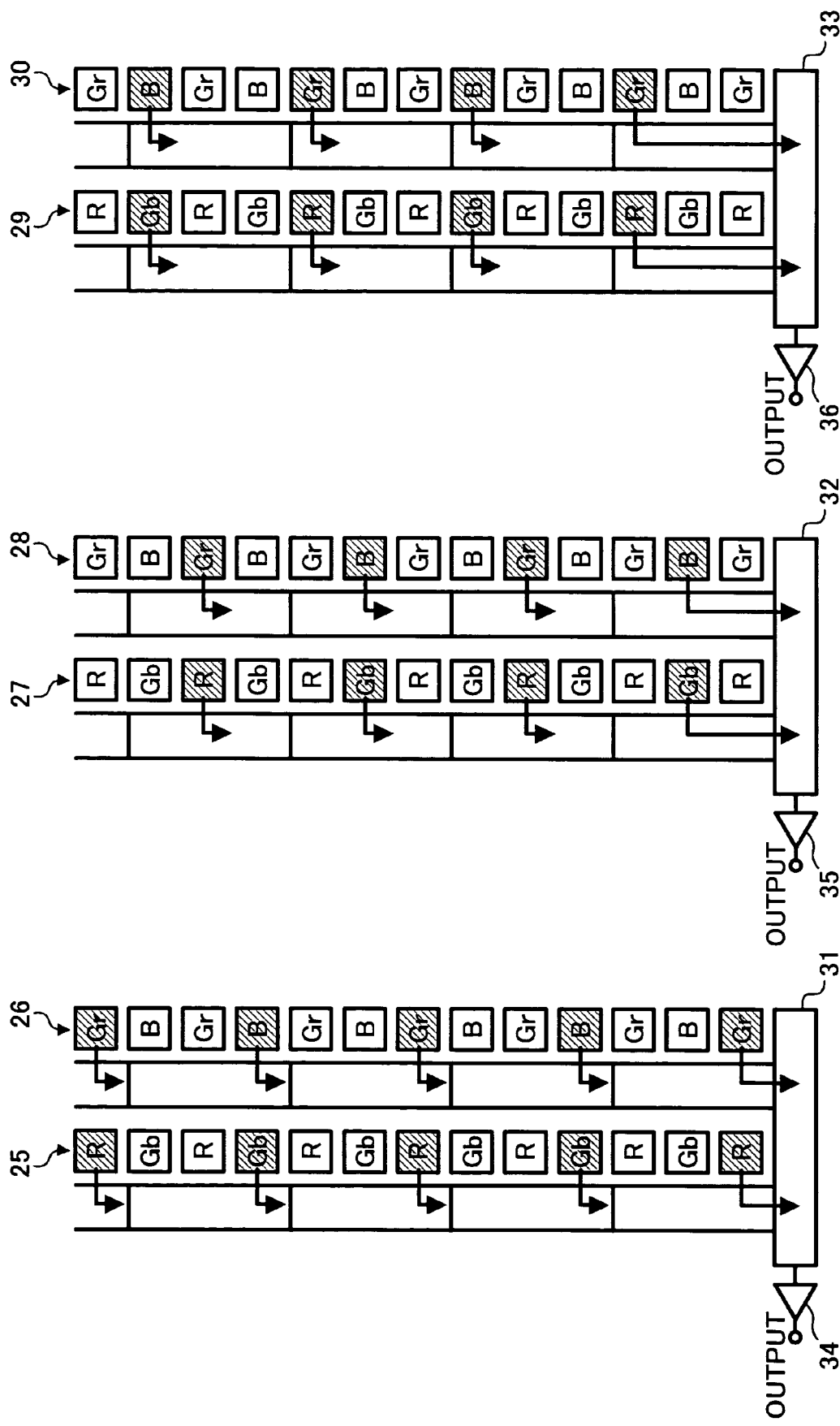
FIG. 2A is a schematic view of a part of a construction in a first field of a CCD driven by a frame mode according to the embodiment of the present invention.
FIG. 2B is a schematic view of a part of a construction in a second field of the CCD driven by the frame mode according to the embodiment of the present invention.
FIG. 2C is a schematic view of a part of a construction in a third field of the CCD driven by the frame mode according to the embodiment of the present invention.

FIGS. 2A through 2C are schematic views of a part of a construction of the CCD 1 driven by a frame mode. In FIG. 2A, reference numerals 25 and 26 indicate vertical pixel rows in the first field. In FIG. 2B, reference numerals 27 and 28 indicate vertical pixel rows in the second field. In FIG. 2C, reference numerals 29 and 30 indicate vertical pixel rows in the third field. Further, in FIGS. 2A through 2C, reference numerals 31, 32, and 33 indicate horizontal transfer paths in the first, second, and third fields, respectively. Moreover, reference numerals 34, 35, and 36 indicate output amplifiers in the first, second, and third fields, respectively.

Figure 3:
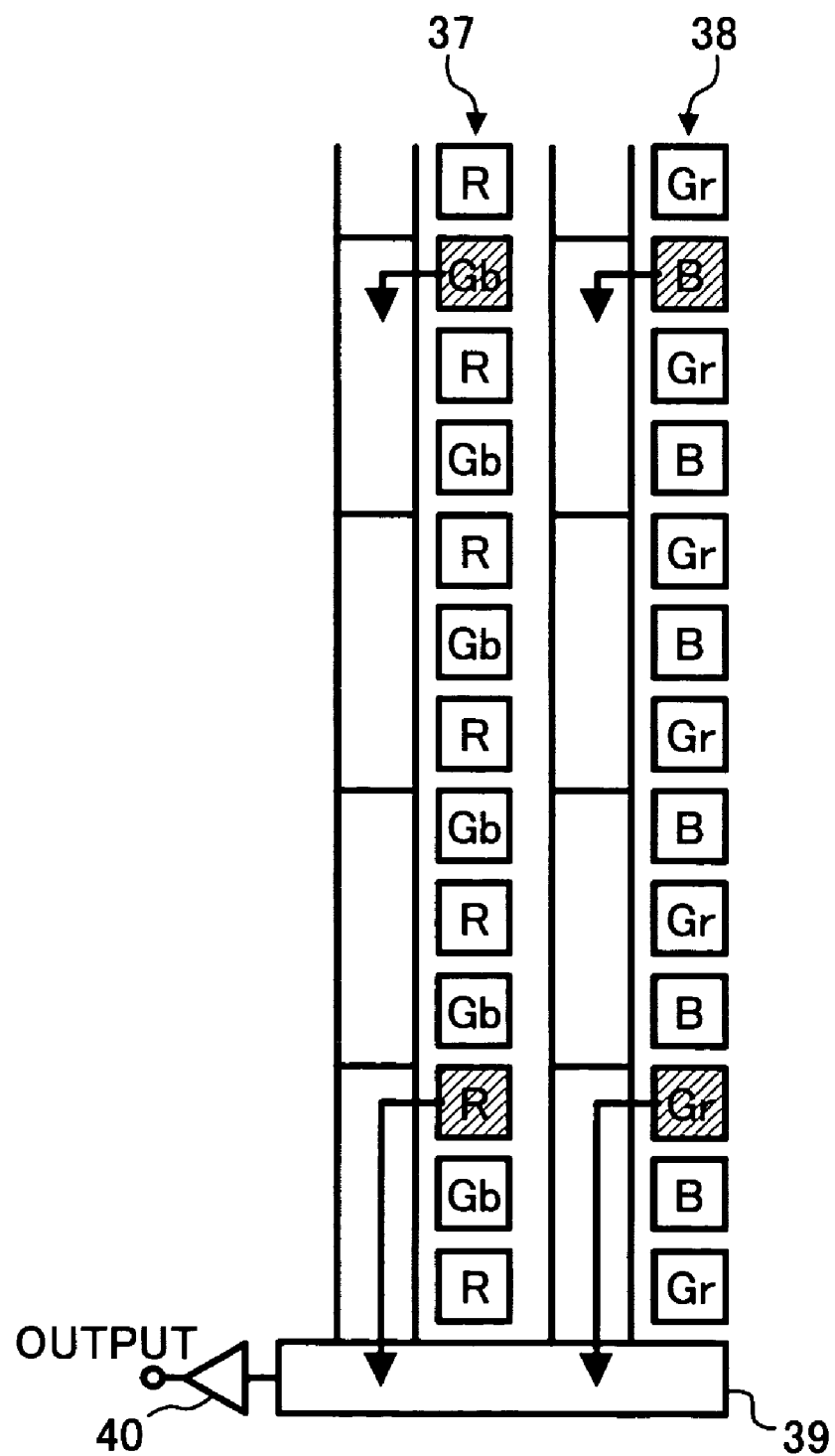
FIG. 3 is a schematic view of a part of a construction of the CCD driven by a draft mode according to the embodiment of the present invention.

FIG. 3 is a schematic view of a part of the construction of the CCD 1 driven by a draft mode. In FIG. 3, reference numerals 37 and 38 indicate vertical pixel rows, a reference numeral 39 indicates a horizontal transfer path, and a reference numeral 40 indicates an output amplifier.

In FIGS. 2A through 2C and FIG. 3, a reference character "R" indicates a red-filtered pixel, reference characters "Gb" and "Gr" indicate green-filtered pixels, and a reference character "B" indicates a blue-filtered pixel. Shaded pixels in FIGS. 2A through 2C and FIG. 3 are to be read out from the respective fields.

As seen from FIGS. 2A through 2C, in any one of the first through third fields in the frame mode, all colors are obtained. Further, as seen from FIG. 3, two pixels out of vertical 12 pixels are read out in the draft mode.

In the case of 3 million pixel CCD, the number of recording pixels is generally set to 2048×1536 pixels. Accordingly, the number of effective horizontal lines in the draft mode is 256 obtained by 1536×(2/12), and the number of effective horizontal lines per one field in the frame mode is 512 obtained by 1536/3. To maintain the aspect ratio, pixels in the horizontal direction are thinned out in the image processing unit 10 in the image processing LSI 9. Further, the ratio of time for reading out pixels in one frame of the CCD 1 between the draft and frame modes equals to the ratio of the number of effective horizontal lines between the draft and frame modes unless the horizontal transfer frequency is changed.

When the fastest horizontal drive frequency which guarantees an adequate operation of the CCD 1 is set to 24 MHz, and when driving the CCD 1 with such a horizontal drive frequency, a frame rate in the draft mode is 30 fps (frame/seconds). However, to reduce a consumption of electric power in this digital camera, the CCD 1 is driven with a horizontal drive frequency of 12 MHz, and regular monitoring is performed with a frame rate of 15 fps.

The clock generator 13 causes the TG 5 to oscillate. The frequency of the clock generator 13 can be changed to any desired value under the control of the CPU 11. The exemplary digital camera has a fixed aperture. In the digital camera, the exposure is controlled by changing the number of electronic shutter pulses output from the TG 5. The exposure is controlled as follows. The CPU 11 receives an exposure evaluation value output from the image processing unit 10, and sets an adequate number of electronic shutter pulses output from the TG 5 based on the exposure evaluation value.

The digital camera includes the focus mechanism 4 that performs an auto focusing when recording an object image. In addition, the digital camera adjusts a focus position manually. In the case of a manual focusing, an image is enlarged and displayed on a part of a screen of the LCD 14 for easy recognition of a focus condition. For example, the LCD 14 is of about 80,000 pixel type (320×240).

The AGC 7 amplifies the signal of the CCD 1 to align with a dynamic range of the ADC 8. An adequate amount of picture signal is converted from an analog signal to a digital signal in the ADC 8, and is transmitted to the image processing unit 10. In the image processing unit 10, various kinds of image processing, such as, a pedestal processing, a color separation processing, an interpolating processing, a white balance processing, a γ processing, and a RGB→YUV processing, are performed. In the case of monitoring, images are continuously output to the LDC 14.

When recording images, after a recording frame of the CCD 1 is exposed to light, the shutter mechanism 3 is closed, and the drive of the CCD 1 is set to be the frame mode. After overall pixels are read out from the CCD 1, image data is subjected to the above-described various kinds of image processing in the image processing unit 10, and is compressed in conformity with the Joint Photographic Expert Group (JPEG) standard, and is recorded in the recording medium 22.

Next, a relation between the number of effective horizontal lines of the CCD 1 and the number of horizontal lines of the LCD 14 will be described.

In FIGS. 4A through 4I, a reference numeral 41 indicates an effective frame of the CCD 1, a reference numeral 42 indicates a linear image, a reference numeral 43 indicates data output from the CCD 1, a reference numeral 44 indicates an image displayed on the LCD 14, and a reference numeral 45 indicates image data to be enlarged and displayed on the LCD 14. Each of hatched portions corresponds to an area of half in the vertical direction and half in the horizontal direction of an angle of view of an object to be photographed around a center line, and corresponds to a quarter of an overall area.

FIG. 4A is a schematic view illustrating an image projected on the CCD 1. In the range of the effective frame 41 of the CCD 1, the exemplary linear image 42 is projected. FIG. 4B is a schematic view illustrating output data 43 from the CCD 1, which is thinned out in the vertical direction in a draft mode. Because the output data 43 in the horizontal direction is not thinned out, an image becomes landscape as illustrated in FIG. 4B. FIG. 4C is a schematic view illustrating an image displayed on the LCD 14 in which the output data 43 in the horizontal direction is thinned out to maintain an aspect ratio. As described below, a resolution adjustment is performed.

During monitoring, the CCD 1 is driven by a draft mode, and its number of effective horizontal lines is 256 as described above. On the other hand, the number of horizontal lines of the LCD 14 is 240. Therefore, in this condition, the number of effective horizontal lines of the CCD 1 is greater than the number of horizontal lines of the LCD 14. Further, as described above, a frame rate in the draft mode is 15 fps. With regard to a difference between the number of effective horizontal lines of the CCD 1 and the number of horizontal lines of the LCD 14, that is, "256−240"=16 lines, the image processing unit 10 performs a thinning out processing, adjusts the resolution, and displays an image obtained by the CCD 1 at 100% angle of view on the LCD 14 as illustrated in FIG. 4C.

Next, a case in which an image is enlarged and displayed in a manual focus mode will be described. If the CCD 1 is still driven by a draft mode and if an image is enlarged by 6.7% corresponding to the above-described thinned-out 16 lines, the number of effective horizontal lines of the CCD 1 becomes equal to the number of horizontal lines of the LCD 14. If the image is further enlarged, the resolution provided by the LCD 14 cannot be fully used.

For example, assuming that a hatched area including a center part of a displayed image in FIG. 4D is enlarged. In the draft mode, no further displayed image data except for the image data corresponding to the above-described thinned-out 16 lines exists. Therefore, the image data 45 illustrated in FIG. 4E to be enlarged and displayed is just proportionally enlarged. As a result, as illustrated in FIG. 4F, a part of the image in FIG. 4C is merely enlarged and displayed, and does not become a detailed image.

As described above, even though an image is enlarged and displayed, only a fuzzy image is displayed on the LCD 14. When an operator performs an accurate focusing required in a macrophotography with a shallow depth-of-field, the operator may be insecure about such a fuzzy image.

Figure 4I:
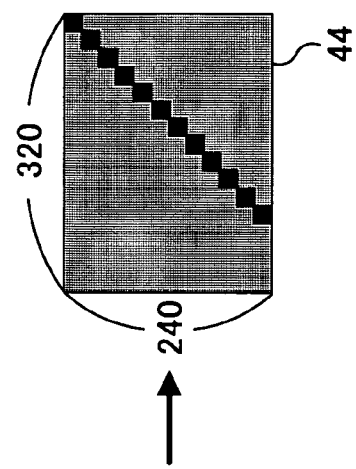
FIG. 4I is a schematic view of an enlarged image displayed on the LCD.

In the present embodiment, when an enlarged display is instructed by the enlarging display setting device 17, the instruction for switching the drive mode of the CCD 1 to the frame mode is sent from the CPU 11 to the TG5. With such an instruction, the number of effective horizontal lines of the CCD 1 per one field becomes 512 as illustrated in FIG. 4G. FIG. 4G is a schematic view illustrating an image read out from the CCD 1 by the frame mode and adjusted in accordance with an aspect ratio.

Figure 4H:
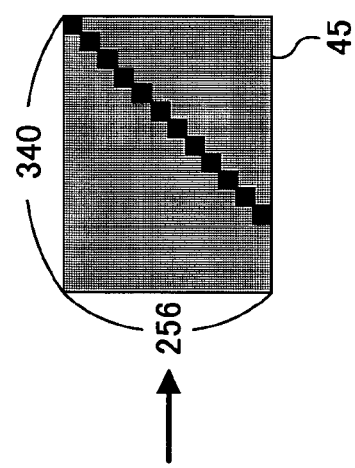
FIG. 4H is a schematic view of a hatched area of FIG. 4G.
Figure 4G:
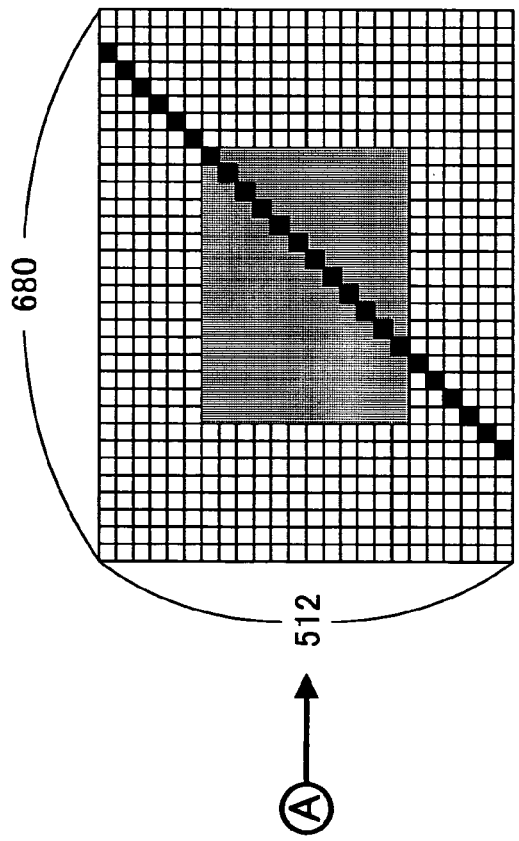
FIG. 4G is a schematic view illustrating an image read out from the CCD 1 by a frame mode and adjusted in accordance with an aspect ratio.

FIG. 4H illustrates image data 45 obtained by cutting out a hatched portion of an overall image of FIG. 4G. The image data 45 is enlarged and displayed on the LCD 14 as the image 44 as illustrated in FIG. 4I. Even though the image data 45 is enlarged and displayed on an entire screen of the LCD 14, 256 effective horizontal lines exist. Therefore, the relationship in which the number of effective horizontal lines of the CCD 1 is greater than the number of horizontal lines of the LCD 14, can be maintained.

In the present embodiment, the image data 45 can be enlarged until when the number of effective horizontal lines of the CCD 1 equals the number of horizontal lines of the LCD 14. Accordingly, image data can be enlarged by at most about 213% in a system according to the embodiment of the present invention. Thus, in this embodiment, any desired enlargement ratio up to a predetermined enlargement ratio obtained when the number of effective horizontal lines of the CCD 1 equals the number of horizontal lines of the LCD 14, can be selected.

As described above, in this embodiment, the CCD 1 has 3 million pixels. If the CCD 1 has pixels greater than 3 million pixels, a little greater enlargement ratio can be obtained even in the draft mode. If an enlargement ratio is calculated while using a CCD having 6 million pixels (double 3 million pixels), the enlargement ratio of about 150% can be obtained even in the draft mode. For example, the enlarging display setting device 17 may be formed from a press button. If the press button is depressed one time, an enlarged image may be displayed still in the draft mode. If the press button is depressed one more time, the drive mode of the CCD 1 may be switched to the frame mode from the draft mode to display an enlarged image. Alternatively, the drive mode of the CCD 1 may be switched to the frame mode by continuously depressing the press button for a predetermined period of time or more.

When switching to the frame mode, if the horizontal drive frequency of the CCD 1 remains at 12 MHz, the frame rate in the frame mode becomes half of that in the draft mode, i.e., 7.5 fps, because the number of horizontal lines becomes double in the frame mode. When the frame rate is decreased, the time until data of an image focused at a focus position is output to the LCD 14 increases (this is called "delay"), resulting in difficulty in focusing.

To prevent such a delay, a clock frequency output from the clock generator 13 is changed from 12 MHz to 24 MHz. By doing so, an enlarged image having a high resolution can be obtained on the display while maintaining the frame rate in the draft mode. Thus, the operability of the digital camera can be enhanced. However, the increase of the drive frequency of the CCD 1 results in the increase of the consumption of electric power. Because the increase of the consumption of electric power is not preferable for a portable camera, the frame rate may remain late to avoid the increase of the consumption of electric power. As described above, there are good and bad points. Therefore, a switch (SW) used for switching the setting if the clock frequency output from the clock generator 13 is increased or not, may be provided as illustrated in FIG. 1.

When the remaining capacity of the power supply 51 is low (e.g., less than a predetermined value), because an operation that significantly consumes electric power is not preferable, it is preferable that the value of the drive frequency of the CCD 1 be kept to the value at the time of the draft mode regardless of whether the switch (SW) is switched or not. Generally, the digital camera includes the power supply capacity checking device 25 that constantly checks the remaining capacity of the power supply 51 for displaying the remaining capacity of the power supply 51 for notifying an operator. The data obtained by the power supply capacity checking device 25 can be utilized for the above-described situation.

FIG. 5 is a timing chart for explaining electronic shutter pulses according to the embodiment of the present invention.

The timing pulses for electronic shutter pulses are generally output in synchronization with horizontal synchronized signals (HD). When the horizontal drive frequency is increased double from 12 MHz to 24 MHz, if the number of electronic shutter pulses is not changed, an exposure amount exceeds an adequate exposure amount. Therefore, in the present embodiment, as illustrated in FIG. 5, the number of electronic shutter pulses is increased double when the horizontal drive frequency is increased double from 12 MHz to 24 MHz. By doing so, an exposure time is equal in both cases where the horizontal drive frequencies are 12 MHz and 24 MHz. As a result, an adequate exposure amount is obtained.

FIG. 6 is a timing chart for explaining electronic shutter pulses according to an alternative embodiment of the present invention. In this alternative embodiment, the number of electronic shutter pulses is unchanged even though the horizontal drive frequency is changed from 12 MHz to 24 MHz while thinning out every other pulse of the horizontal synchronized signals (HD).

Specifically, referring to FIG. 6, when a horizontal drive frequency is 12 MHz, electronic shutter pulses are generated corresponding to pulses of the horizontal synchronized signals (HD), respectively. When a horizontal drive frequency is 24 MHz, a time period between the horizontal synchronized signals (HD) becomes half, and the number of pulses of the horizontal synchronized signals (HD) per unit time becomes double. To obtain an adequate exposure amount, electronic shutter pulses are generated corresponding to every other pulse of the horizontal synchronized signals (HD). The corresponding relation between the pulses of the horizontal synchronized signals (HD) and the electronic shutter pulses is partially indicated by dotted lines in FIG. 6. In this alternative embodiment, a pulse interval between electronic shutter pulses when the horizontal drive frequency is 24 MHz equals a pulse interval between electronic shutter pulses when the horizontal drive frequency is 12 MHz. Therefore, there is no influence on an exposure time, and an adequate exposure amount can be obtained.

With regard to a position of an enlarged image in a display screen of the LCD 14, it is generally sufficient that a focus area is enlarged and displayed. However, especially when performing a manual focus, an object which needs to be focused does not necessarily exist in a focus area. To enhance operability of a digital camera, the enlarging display position designating device 18 may be provided. By using the enlarging display position designating device 18, an operator designates any desired position in the display screen of the LCD 14. An image around the designated position is enlarged and displayed on the LCD 14.

The display method of an enlarged image and the switch timing of the drive of the CCD 1 are not limited to the above. For example, when a digital camera has an auto focus function and the release button 52 which is depressed stepwise (e.g., two steps), to confirm an auto focus condition, the drive of the CCD 1 may be switched and an enlarged image may be displayed on the LCD 14 when the release button 52 is half depressed (i.e., at a first step).

In the above-described embodiment, when the drive mode of the CCD 1 is switched from the draft mode to the frame mode, an image is displayed on the LCD 14 by using only one field out of the three fields. However, especially when an enlargement ratio is required to be increased, an image is displayed on the LCD 14 by using all three fields. In this case, the enlargement ratio is increased three times. When using all three fields, all recorded image data of an object is taken in, thereby decreasing a frame rate.

For example, an auto focus operation is performed while displaying an enlarged image, and an image at the moment when the auto focus operation is completed (i.e., auto focus is set) is used for enlarging and displaying on the LCD 14. The data in three fields is output in time sequence by field. To take in all data in three fields, a mechanical shutter needs to be closed once as in the case of a regular photography, to avoid the change of transferred data.

Further, because data in three fields is required to be combined, it takes time for displaying an image as compared to the case when an image is displayed by using only one field. Therefore, as it is difficult to refresh image continuously, it is preferable that an enlarged image for display be stored in a memory and temporally displayed as a still image. If the release button 52 is not depressed at second time (i.e., a second step) even though a still image is displayed enough for an operator to confirm a focus condition, the still image is returned to a regular enlarged image or a whole image. A time for displaying a still image is not preferably long because an object and a digital camera may move. The time for displaying a still image may be about one second which allows an operator to determine if a focus condition is good or bad.

For an operator who dislikes the display of a still image, the display of enlarged image by using data in three fields may be selected as an option. In this case, such a display may be selected by operating, for example, a slide switch or a seesaw switch provided on a part of the enlarging display setting device 17.

Further, because an image is enlarged and displayed by using a great amount of data in three fields, an image is preferably displayed at a maximum enlargement ratio. However, depending on an object, a pattern which shows a focus condition may not be included in an enlarged area. Therefore, an image should not be always enlarged at the maximum enlargement ratio. It is preferable that an image be enlarged and displayed at the maximum enlargement ratio when there is no particular instruction for an enlargement ratio. If there is an instruction for an enlargement ratio, an enlarged image may be changed while gradually decreasing an enlargement ratio in accordance with an instruction, for example, based on the number of times when a press-button is pressed. This press-button may be the above-described press-button constructing the enlarging display setting device 17 used for switching between the draft mode and the frame mode.

Similar function can be added when performing a manual focus operation. Specifically, when an operator performs a manual focus operation while moving a lens, a whole image by a draft mode or an enlarged image read out from one field of the CCD 1 by the frame mode is displayed in accordance with an instruction until an image is focused. When the manual focus operation is completed, a still image of an enlarged image read out from three fields of the CCD 1 is temporally displayed on the LCD 14.

When displaying an enlarged image in an overall screen of the LCD 14, and when an enlarged image is inserted in the overall screen of the LCD 14 such that the enlarged image overlaps with a whole image, only a frame of an area in which an image is enlarged is displayed in advance until an enlarging display is instructed from the enlarging display setting device 17. With such an "on screen display", usability of the digital camera is enhanced.

According to the embodiments of the present invention, in the digital camera using the imaging device (CCD 1) having the number of pixels greater than that of the pixels of the image display device (LCD 14), an operator can confirm an accurate focus condition by changing the drive mode for the CCD 1 from the draft mode to the frame mode when a part of an image is enlarged and displayed on the LCD 14 for confirming the focus condition. An enlarged image having a high resolution can be obtained on the LCD 14 without changing the frame rate between the draft mode and the frame mode. Thus, the operability of the digital camera can be enhanced.

The present invention has been described with respect to the exemplary embodiments illustrated in the figures. However, the present invention is not limited to these embodiments and may be practiced otherwise.

Numerous additional modifications and variations of the present invention are possible in light of the above teachings. It is therefore understood that within the scope of the appended claims, the present invention may be practiced other than as specifically described herein.

The invention claimed is:

1. A digital camera, comprising:
   an imaging device driven by a plurality of kinds of drive modes, the plurality of kinds of drive modes including a draft mode and a first frame mode;
   an image display device having a number of pixels less than a number of pixels of the imaging device; and
   an enlarging display setting device configured to enlarge a part of an area of a whole image obtained by the imaging device at a desired enlargement ratio and to display the part of the area being enlarged as an enlarged image on the image display device, wherein
   the drive modes for driving the imaging device is changed to the first frame mode such that a resolution of the enlarged image is equal to or greater than a resolution of the image display device,
   the first frame mode including dividing the overall pixels of the imaging device into a plurality of fields, and reading at least one of the plurality of fields of the imaging device to obtain image data, the enlarged image being taken in from at least a portion of the image data,
   a timing generator configured to generate clock signals to drive the imaging device; and
   a clock generator configured to change clock signals input to the timing generator from one frequency to another frequency,
   wherein when the drive mode is changed to the first frame mode from the draft mode, a refresh rate of an image output from one frame of the imaging device is prevented from changing by changing a clock frequency output from the clock generator, and
   wherein when the clock frequency output from the clock generator is changed, an exposure amount is prevented from changing by keeping a pulse interval between electronic shutter pulses output to the imaging device.

2. The digital camera according to claim 1, further comprising:
   an enlarging display position designating device configured to designate a desired position in an image displayed on the image display device, wherein the image displayed on the image display device is enlarged around the position designated by the enlarging display position designating device.

3. The digital camera according to claim 1, wherein when the clock frequency output from the clock generator is changed, an exposure amount is also prevented from changing by changing a number of electronic shutter pulses output to the imaging device.

4. The digital camera according to claim 1, wherein the digital camera has a manual focus function, and when the manual focus function is performed, the enlarged image is displayed on the image display device one of automatically and in accordance with an instruction to the enlarging display setting device.

5. The digital camera according to claim 1, further comprising:
a release button used for performing a shutter release operation for photographing, wherein the digital camera has an auto focus function and performs the shutter release operation while depressing the release button stepwise, and wherein when the release button is depressed at a first step, an auto focus function is performed and the enlarged image is displayed on the image display device.

6. The digital camera according to claim 1, further comprising:
a release button used for performing a shutter release operation for photographing, wherein when the release button is depressed for photographing, the whole image is recorded while displaying the enlarged image on the image display device.

7. The digital camera according to claim 1, wherein even though a first enlargement instruction is input to the enlarging display setting device, a maximum enlarged image is displayed on the image display device under the condition that the drive mode is not changed to the first frame mode.

8. The digital camera according to claim 7, wherein when a second enlargement instruction is input to the enlarging display setting device, the drive mode is changed to the first frame mode.

9. The digital camera according to claim 1, when an enlargement instruction is input to the enlarging display setting device for a predetermined period of time or more, the drive mode is changed to the first frame mode.

10. The digital camera according to claim 1, further comprising:
a switch configured to switch a setting if the clock frequency output from the clock generator is changed or not when the drive mode is changed to the first frame mode.

11. The digital camera according to claim 10, further comprising:
a power supply capacity checking device configured to check and detect a capacity of a power supply, wherein when the power supply capacity checking device detects that the capacity of the power supply is less than a predetermined value, the clock frequency output from the clock generator is not increased regardless of whether the switch switches the setting or not.

12. The digital camera according to claim 1, wherein the plurality of kinds of drive modes further includes a second frame mode,
the drive mode for driving the imaging device is changed to the second frame mode such that an enlargement ratio used for the second frame mode is different than an enlargement ratio used for the first frame mode, and
the second frame mode includes dividing the overall pixels of the imaging device into a plurality of fields, and reading at least one of the plurality of fields of the imaging device to obtain image data, the enlarged image being taken in from at least a portion of the image data.

13. The digital camera according to claim 12, wherein the digital camera performs a focus operation, and the enlarged image is displayed as a still image for a predetermined period of time when the focus operation is completed.

14. The digital camera according to claim 13, wherein the enlarged image is displayed at a maximum enlargement ratio when there is no particular instruction for the desired enlargement ratio.

15. The digital camera according to claim 14, wherein the enlarged image is changed while gradually decreasing an enlargement ratio in accordance with an instruction.

16. The digital camera according to claim 15, wherein a display of the enlarged image is selected as an option.

17. The digital camera according to claim 1, wherein electronic shutter pulses are generated corresponding to every other pulse of a horizontal synchronized signal such that the horizontal synchronized signal is thinned out.

18. A digital camera, comprising:
an imaging device driven by a plurality of kinds of drive modes, the plurality of kinds of drive modes including a draft mode and a first frame mode;
an image display device having a number of pixels less than a number of pixels of the imaging device; and
means for enlarging a part of an area of a whole image obtained by the imaging device at a desired enlargement ratio and for displaying the part of the area being enlarged as an enlarged image on the image display device,
wherein one of the at least two kinds of drive modes for driving the imaging device is changed to the first frame mode such that a resolution of the enlarged image is equal to or greater than a resolution of the image display device,
the first frame mode including dividing the overall pixels of the imaging device into a plurality of fields, and reading at least one of the plurality of fields of the imaging device to obtain image data, the enlarged image being taken in from at least a portion of the image data,
wherein even though a first enlargement instruction is input to the means for enlarging, a maximum enlarged image is displayed on the image display device under the condition that the drive mode is not changed to the first frame mode, and
wherein when a second enlargement instruction is input to the means for enlarging, the drive mode is changed to the first frame mode.

19. The digital camera according to claim 18, further comprising:
means for designating a desired position in an image displayed on the image display device, wherein the image displayed on the image display device is enlarged around the position designated by the means for designating.

20. The digital camera according to claim 19, further comprising:
means for generating clock signals to drive the imaging device; and
means for changing clock signals input to the means for generating clock signals to a from one frequency to another frequency.

21. The digital camera according to claim 20, wherein when the drive mode is changed to the first frame mode from the draft mode, a refresh rate of an image output from one frame of the imaging device is prevented from changing by changing a clock frequency output from the means for changing clock signals.

22. The digital camera according to claim 21, further comprising:
switching means for switching a setting if the clock frequency output from the means for changing clock signals is changed or not when the selected drive mode is changed.

23. The digital camera according to claim 22, further comprising:

means for checking and detecting a capacity of a power supply, wherein when the means for checking and detecting detects that the capacity of the power supply is less than a predetermined value, the clock frequency output from the means for changing clock signals is not increased regardless of whether the switching means switches the setting or not.

24. A method of obtaining images using a digital camera having an imaging device driven by a plurality of kinds of drive modes, the plurality of kinds of drive modes including a draft mode and a first frame mode and an image display device having a number of pixels less than a number of pixels of the imaging device, comprising:

obtaining a whole image using the imaging device;

enlarging a part of an area of the whole image obtained by the imaging device at a desired enlargement ratio;

displaying the part of the area being enlarged as an enlarged image on the image display device;

changing the drive modes for driving the imaging device to the first frame mode such that a resolution of the enlarged image is equal to or greater than a resolution of the image display device;

dividing the overall pixels of the imaging device into a plurality of fields in the first frame mode;

reading at least one of the plurality of fields of the imaging device to obtain image data, the enlarged image being taken in from at least a portion of the image data;

generating clock signals to drive the imaging device; and changing clock signals input to the generating from one frequency to another frequency, changing a clock frequency output from the generating such that when the drive mode is changed to the first frame mode from the draft mode, such that a refresh rate of an image output from one frame of the imaging device is prevented from changing, and keeping a pulse interval between electronic shutter pulses output to the imaging device, when the clock frequency output from the generating is changed, such that an exposure amount is prevented from changing.

25. The method according to claim 24, further comprising:
designating a desired position in an image displayed on the image display device; and
enlarging the image displayed on the image display device around the designated position.

26. The method according to claim 24, further comprising:
changing a number of electronic shutter pulses output to the imaging device when the clock frequency output from the clock generator is changed such that an exposure amount is also prevented from changing.

27. The method according to claim 24, further comprising:
displaying the enlarged image on the image display device either automatically or in accordance with an instruction in response to a performance of a manual focus function of the digital camera.

28. The method according to claim 24, further comprising:
performing an auto focus function when a release button is depressed, the release button used for performing a shutter release operation for photographing.

29. The method according to claim 24, further comprising:
recording the whole image while displaying the enlarged image on the image display device when a release button used for performing a shutter release operation for photographing is depressed.

30. The method according to claim 24, further comprising:
changing the drive mode for driving the imaging device to the second frame mode such that an enlargement ratio used for the second frame mode is different than an enlargement ratio used for the first frame mode;
dividing the overall pixels of the imaging device into a plurality of fields in the second frame mode; and
reading the plurality of fields of the imaging device to obtain image data, the enlarged image being taken in from at least a portion of the image data in the second frame mode.

* * * * *